United States Patent [19]

Smith et al.

[11] Patent Number: 5,219,037
[45] Date of Patent: Jun. 15, 1993

[54] COMPONENT MOUNT ASSEMBLY PROVIDING ACTIVE CONTROL OF VEHICLE VIBRATION

[75] Inventors: Stanley E. Smith; Robert R. Klein, Dayton, both of Ohio; William E. Gossman, Silver Spring; Scott K. Miller, Baltimore, both of Md.

[73] Assignees: General Motors Corporation, Detroit, Mich.; Noise Cancellation Technologies, Inc., Linthicum, Md.

[21] Appl. No.: 822,795

[22] Filed: Jan. 21, 1992

[51] Int. Cl.$^5$ .............................. B62D 21/00
[52] U.S. Cl. ..................... 180/312; 280/707; 280/716; 267/140.13; 267/140.14; 364/724.01
[58] Field of Search ............ 180/312; 267/140.13, 267/140.14; 280/707, 716; 364/724.01

[56] References Cited

U.S. PATENT DOCUMENTS

| | | | |
|---|---|---|---|
| 4,153,815 | 5/1979 | Chaplin et al. | 381/71 |
| 4,417,098 | 11/1983 | Chaplin et al. | 381/94 |
| 4,480,333 | 10/1984 | Ross | 381/71 |
| 4,588,173 | 5/1986 | Gold et al. | 267/140.13 |
| 4,783,062 | 11/1988 | Hamberg et al. | 267/140.14 |
| 4,878,188 | 10/1989 | Ziegler, Jr. | 364/724.01 |
| 5,052,662 | 10/1991 | Doi | 180/312 |
| 5,060,919 | 10/1991 | Takano et al. | 180/312 |

Primary Examiner—Kenneth R. Rice
Attorney, Agent, or Firm—Ronald L. Phillips

[57] ABSTRACT

A mount assembly is provided for mounting a component, such as an engine, to a vehicle for active control of vibration. The assembly includes first and second mounting members and, an intermediate insert with first and second elastomeric systems connecting said first and second mounting members with the intermediate insert in between. An actuator in parallel with said first elastomeric system provides vertical force to said first elastomeric system to provide a relatively soft vertical rate. A controller operates the actuator in response to sensed vibration so that the vertical force tends to avoid or cancel it. A relatively high fore/aft and lateral dynamic rate of the first system protects the actuator. The second elastomeric system connects the second mounting member with the intermediate insert and exhibits a relatively high vertical rate and a relatively soft fore/aft and lateral rate. One or more sensors feeds data to a controller that analyzes the vibrations to determine the harmonics thereof. The controller then constructs one or more output waveforms and feeds them to the actuator so that a force is applied across the first elastomeric system between the first mounting member and the intermediate insert, thereby tending to produce the relatively soft vertical rate for component isolation and noise suppression.

7 Claims, 2 Drawing Sheets

COMPONENT MOUNT ASSEMBLY PROVIDING ACTIVE CONTROL OF VEHICLE VIBRATION

TECHNICAL FIELD

The present invention relates generally to a component mount assembly and, more particularly, to such a mount assembly furnishing active control of vibrations in a vehicle or any other equipment in which vibration is transmitted between components.

BACKGROUND OF THE INVENTION

Several different types of mount assemblies are available to isolate component vibrations, such as produced during operation of automobile and truck engines and transmissions. A type of mount commonly used today is the solid elastomeric block fabricated, for example, of natural or synthetic rubber integrally molded with rate plates and including metal mounting platforms and bolts for attachment. In order to support an engine or the like, a number of these solid elastomeric mounts are attached between the mounted component and the vehicle frame.

When utilized in this manner, the mounts are required to support the engine or other component in the manner of a spring while also functioning as a shock absorber element to dampen vibrations. These dual functions often require conflicting operating characteristics and, accordingly, a trade-off of different design considerations. As a result, the mount is a subject of compromises in design, providing neither optimum motion control nor isolation properties.

More particularly, while solid elastomeric mounts may be designed to operate in a generally satisfactory manner, engineers are limited in what may be achieved. For example, many elastomeric or rubber-like materials selected for their load support properties inherently have high stiffness limiting their ability to isolate certain objectionable vibratory inputs, such as those particularly disturbing to occupants in a modern, downsized vehicle having a unitized vehicle body and frame construction. Accordingly, there is a need for improvement in balancing these conflicting dynamic requirements of load support/motion control and vibration control.

High damping is generally desired to reduce low frequency, high amplitude vibrations of the mounted component. One approach to increase the damping coefficient is by the selection of certain polymers and the use of additives. Thus far, however, this approach has proven unsatisfactory because of accompanying adverse effects on other properties of the material including loss of durability. Furthermore, this approach produces large damping for all vibratory inputs regardless of frequency or amplitude. This is undesirable in an engine mount, particularly in the low amplitude and high frequency ranges, as it leads to the increased transmission of noise.

As a result of these difficulties, there has been an ongoing effort in progress to produce a cost-effective means of providing prescribed and varying mount properties, tuned to selectively suppress vibrations of particular problem amplitudes and frequencies. In the case of an engine mount, this calls for substantially increased damping of certain low frequency and high amplitude vibrations. This needs to be accomplished, however, while maintaining relatively reduced damping and stiffness in the case of low amplitude and high frequency vibrations so as to provide desired noise suppression.

Stated another way, the bottom line is the provision of a mount assembly having a dynamic rate meeting load support requirements, as well as the needs of vibration control including (1) the suppression and isolation of noise, i.e. engine-produced vibrations typically lying in a frequency range of 20 to 400 Hz, and (2) effective damping of larger engine displacements or shake, i.e. the effect on the vehicle body of the coupling of high amplitude vibrations of the body, engine and suspension, typically in the frequency range of 8 to 16 Hz. Furthermore, the desired mount characteristics should be achieved in a way that does not compromise other design considerations, such as prescribed stiffness ratios along the major axis for load support, and prescribed mount configurations to suit packaging space limitations.

In order to achieve this end, various mount assembly designs have been proposed combining hydraulic damping and basic elastomeric mount features. Hydraulic/elastomeric mounts of the type disclosed in, for example, U.S. Pat. No. 4,588,173 to Gold et al., issued May 13, 1986, and assigned to the assignee of the present invention, include features, such as selectively placed damping chamber sections, selective length orifice tracks and decoupler(s), to passively tune the isolation and damping characteristics. Thus, these mount assemblies have met with considerable success compromising the conflicting objectives of load support and engine vibration control.

Other hydraulic elastomeric mounts, such as disclosed in U.S. Pat. No. 4,783,062 to Hamberg et al., issued Nov. 8, 1988, and also assigned to the assignee of the present invention, utilize an adaptive approach. In Hamberg, et al., the mount includes a gate responsive to sensed vibrations to control the flow of hydraulic fluid along the orifice tracks, thereby actively tuning the dynamic characteristics of the mount to even better optimize firm engine support and noise/vibration control over a broader range of operating conditions. As a result of these developments, hydraulic/elastomeric mounts have grown in favor in recent years. They have generally succeeded in being more versatile and responsive than solid elastomeric mounts so as to meet the modern needs of vehicle manufacturers.

While effective for their intended purpose, it must be appreciated that hydraulic/elastomeric mounts are not necessarily the ultimate in mount design and that alternative designs with similar enhanced operating characteristics need to be considered. One possible alternative design is to produce an elastomeric mount assembly without hydraulics, but with active vibration control. The approach is to gain more responsiveness to vehicle operating conditions, and thus better equip the mount to isolate troublesome vibrations and reduce noise, in a manner not possible with past solid elastomeric mount designs. Such an elastomeric mount assembly should be able to provide remarkable dependability over an extended service life.

SUMMARY OF THE INVENTION

Accordingly, it is a primary object of the present invention to provide a mount assembly, for a component, such as an engine to a vehicle, that exhibits additional improvements over other prior art devices incorporating advances of the past and one that is specially adapted to more closely approach the desired balance of firm component support and vibration control.

An additional object of the present invention is to provide an assembly for mounting a component to a vehicle furnishing active control of vibration so as to be tunable to optimize mount characteristics for the optimum noise suppression and possibly component damping.

Another object of the present invention is to provide a mount assembly for a vehicle component furnishing improved active control of vibration, and being of relatively simple construction to operate reliably over an extended service life.

Still a further object of the present invention is to provide a relatively compact mount assembly for a vehicle component especially adapted to provide active control of vibrations and utilizing two separate elastomeric systems in series.

Still another object of the present invention is to provide a mount assembly for a vehicle component including dual elastomeric systems in series and an actuator adapted to provide a harmonic force to, in effect, avoid or cancel the component vibrations transmitted through the mount and thereby provide a dynamic rate providing an effective soft vertical stiffness for smoother and quieter operation and ride, thereby resulting in enhanced customer satisfaction.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an assembly is provided for mounting a component, such as an engine or transmission, to a vehicle. The mount assembly, in the case of an engine mount arrangement, advantageously furnishes active control of vehicle vibration so as to not only provide good engine support and stability, but also a relatively soft vertical rate for vibration isolation, including noise suppression.

More particularly, the mount assembly comprises a first mounting member or platform for mounting, for example, to the engine and a second mounting member or platform for mounting to the vehicle, for example, on the frame. An intermediate insert is also provided. Preferably, the mounting members and the insert are formed from rigid materials, such as fabricated and/or cast steel for added durability and strength.

A first elastomeric system connects the first mounting member and the intermediate insert to provide relatively high fore/aft and lateral dynamic rate. In one embodiment of the invention, the first mounting member includes a depending box beam support. The intermediate insert includes a pair of U-shaped supports. The U-shaped supports are crossed, that is, oriented 90° with respect to one another, so as to provide a base and four upwardly projecting legs. The four depending support walls of the box beam support are received within the support legs. Elastomeric elements, such as rubber pads including integral rate plates (for selective stiffening), are connected in shear load orientation between the cooperating outer faces of the support walls and the juxtaposed inner faces of the support legs. This arrangement allows the first elastomeric system to exhibit a fairly soft vertical rate.

The first mounting member and intermediate insert are also interconnected by an actuator in parallel with this first elastomeric system. The actuator includes a linear driver or motor mounted to the first mounting member and a connecting rod that connects the driver to the intermediate insert. The connecting rod includes a swivel or ball joint coupling at the connecting point if the actuator requires such a device. As will be described in greater detail below, the actuator is utilized to apply a force between the first mounting member and the intermediate insert; the force being particularly adapted to avoid transmission of a sensed vibration force or other quantity representative of force, and thereby produce better component isolation and noise suppression.

While the horizontal rate of the first elastomeric system is selected to be relatively high, the vertical rate is in effect rendered extremely soft as described above. The combined elastomeric support and anti-vibration force operating in the same direction as engine movement (that is as a harmonic), allows vibration to be efficiently and effectively attenuated. The relatively high fore/aft and lateral rate of the first elastomeric system is particularly desirable so that the system can absorb and attenuate vibrations in these directions, but with minimum relative motion. This feature prevents damage to the parallel actuator to assure that it continues functioning properly.

A second elastomeric system is connected in compression load between the base of the intermediate insert and the second mounting member. This second elastomeric system also comprises a solid elastomeric element or pad including spaced metal plates for rate modification; namely, for added stiffening. The second elastomeric system provides a relatively soft fore/aft and lateral rate so as to allow for increased, but controlled deflection in these directions. Advantageously, as the first and second elastomeric systems are provided in series, and thus spanning the intermediate insert, all fore/aft and lateral deflections may thus be absorbed by the mount assembly (as allowed by the swivel joint) without placing any significant strain upon the actuator. The second elastomeric system also provides a relatively high vertical dynamic rate. Accordingly, the mount provides stable support to control vertical engine displacements or motion encountered during certain extreme operating conditions, such as hard acceleration and cornering.

Advantageously, the mount assembly of the present invention is made active and substantially simultaneously responsive to vehicle operating conditions in a unique manner. At least one sensor or transducer, such as a force gauge or an accelerometer, is provided to detect vehicle vibrations, and particularly those emanating from the engine mounted on the vehicle by the mount assembly. More particularly, the sensor preferably detects the force of the vibrations directly from the body, or from a directly connected intermediate location between the engine and body. Information with respect to this force is provided to a controller in the form of a microprocessor, particularly adapted to analyze the information and determine the harmonics of the vibrations thereof, and generate the force via a set algorithm. In effect, the controller substantially instantaneously computes the appropriate harmonic signal that is fed to the particular actuator. The actuator is then operational to provide the selective force tending to follow the engine and effectively soften the first elastomeric mounting member in the vertical direction, and efficiently avoid or cancel the vibration. Accordingly, the present invention makes it possible to effect a relatively soft mount for component isolation and noise suppression, but it should be appreciated that this is done without compromising any of the necessary horizontal stability and firm component support, thus providing for smooth and efficient operation of the vehicle. The controller may also be programmed to exert a force proportional to the relative velocity across the mount, thereby increasing the mount's damping for more effective motion control at low frequencies.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporate herein and forming a part of the specification, illustrates several aspects of the present invention, and together with the description serves to explain the principles of the invention. In the drawing.

Figure 1:
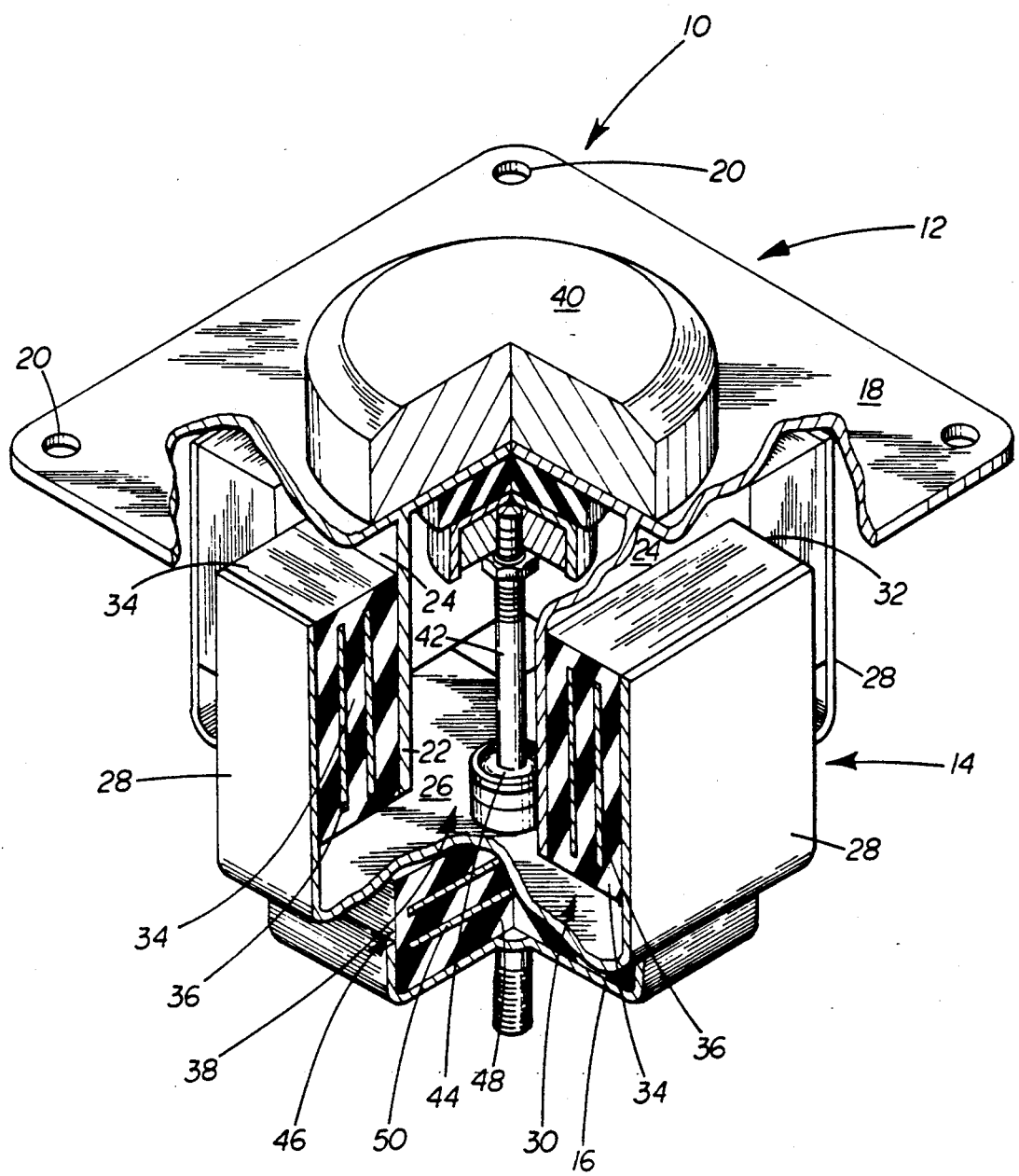
FIG. 1 is a perspective and partially sectional view of a mount assembly of the present invention.

Reference will now be made in detail to the present preferred embodiment of the invention, an example of which is illustrated in the accompanying drawing.

DETAILED DESCRIPTION OF THE INVENTION

Reference is now made to the drawing figures showing the mount assembly 10 of the present invention. As will be explained in detail below, the assembly 10 is particularly adapted to provide active control or suppression of vibration while also maintaining the necessary firm support for the component. Thus, smooth vehicle operation is insured over a wide range of operating conditions.

The mount assembly 10 includes a first mounting member 12, an intermediate insert 14 and a second mounting member 16. In the embodiment shown in FIG. 1, the first mounting member 12 is in the uppermost position and the second mounting member 16 is in the lowermost position. It should be recognized, however, that the invention is not limited to this spatial arrangement and that this relationship is only presented as a preferred embodiment. Indeed, the mount assembly 10 may be utilized to provide lateral load support and vibration control when mounted 90° from the position shown in FIG. 1. Also, any selected number may be used together, preferably with integrated control, to support an engine or other component; but only one being shown and described as the preferred embodiment for simplicity.

The first mounting member 12 of the mount assembly 10 includes a mounting platform 18 positioned in this embodiment in a substantially horizontal plane. The platform 18 includes suitable apertures 20 for receiving mounting bolts (not shown) to allow connection to an engine or other component (not shown) mounted to the vehicle.

A box-beam support 22 depends from the mounting platform 18 and includes four interconnected support walls 24. Preferably, the mounting member 12, including the mounting platform 18 and box-beam support 22 are formed of a rigid, fabricated or cast metal material.

The intermediate insert 14 includes a base plate 26 and four upstanding legs 28 positioned at 90° to each other so as to effectively provide two U-shaped supports.

Figure 2:
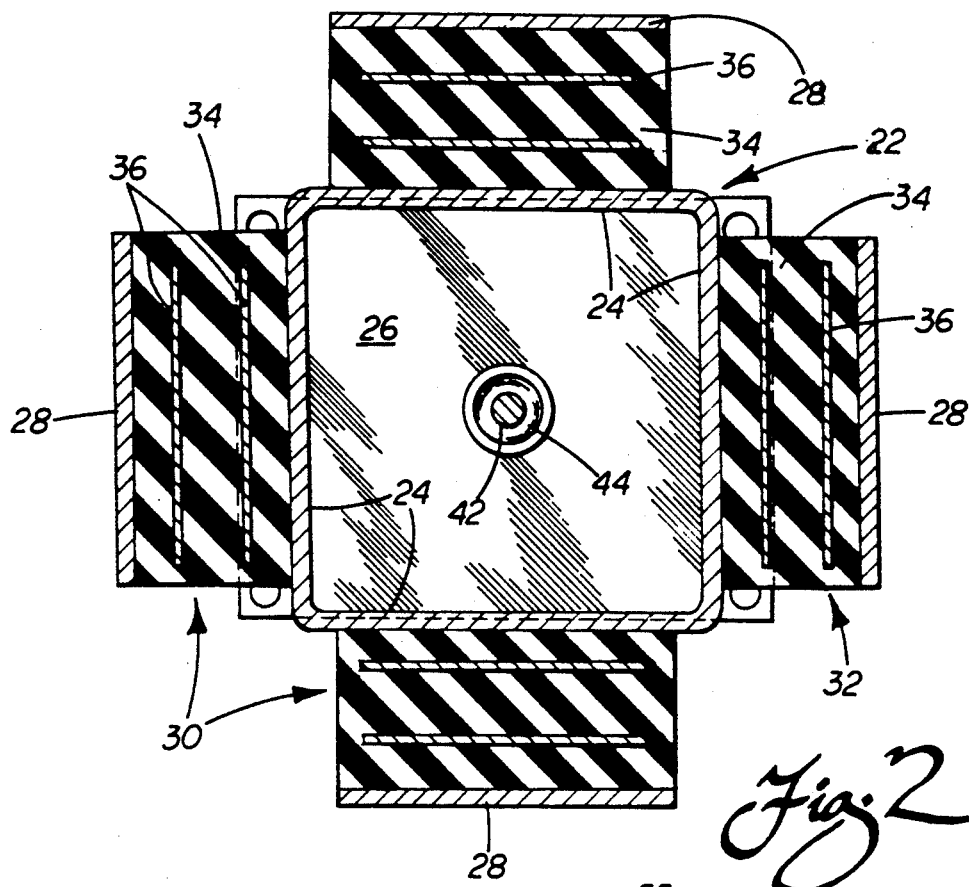
FIG. 2 is a detailed horizontal sectional view of the mount assembly shown in FIG. 1.

As best shown in FIGS. 1 and 2, the box-beam support 22 of the first mounting member 12 is sized for receipt within the upstanding legs 28 of the intermediate insert 14. A first elastomeric system 30 connects the mounting member 12 with the intermediate insert 14 so that it is in effect resiliently suspended. More particularly, the outer face of each support wall 24 is connected to the inner face of each juxtaposed leg 28 by means of an elastomeric pad or element 34 so as to be positioned in shear load orientation. Each pad 34 is selectively stiffened by means of integral metal rate plates 36. A high strength adhesive may be used to securely bond each pad 34 to the corresponding support wall 24 and support leg 28.

An actuator, generally indicated by reference numeral 38, also interconnects the mounting member 12 with the intermediate insert 14. More particularly, the actuator 38 includes a linear driver or motor 40, mounted in a central opening in the mounting platform 18 and a connecting rod 42 extends between the driver and a swivel or ball joint connector 44 on the base plate 26 of the intermediate insert 14. The driver 40 is preferably electrically controlled to apply a force tending to displace (e.g. push or pull) the first mounting member 12 relative to the intermediate insert 14 according to the need to cancel transmitted vibration.

Examples of suitable drivers that may be utilized include: (1) a stationary magnet and moving coil device as manufactured by JBL (Model LM2); (2) a stationary coil and moving magnet device such as manufactured by Contravis, Pittsburgh, Pa.; and (3) a similar linear motor such as manufactured by Aura Automotive Division, Dearborn, Mich. (Model LAV 2-3 5-6). Preferably, the driver 40 provides a stroke of approximately ±0.250 inches, draws a current of 10.0 Amps or less and produces a maximum force of at least approximately 10 lbs, including 6 lbs continuous.

As will be described in detail below, this actuator 38 is utilized to selectively apply a counteracting force tending to avoid a transmitted vibration force and thereby provide vibration control and possibly engine motion control. To put it another way, the mount assembly 10 drops out from under or follows the engine, depending on the particular instantaneous relative movement sensed on the body. As this force is applied directly to the mounting platform 18, that is the load bearing component of the mount assembly 10, efficient and responsive attenuation of vibration is assured. Consequently, vibrational forces applied to the vehicle body are substantially reduced and passenger comfort is enhanced.

Advantageously, the first elastomeric system 30 is provided in parallel with the actuator 38. In this manner, the actuator 38 can also work in concert with the pads 34 to provide efficient load support and damping action.

Another important feature of the first elastomeric system 30 is its design to insure that the actuator 38 is not subject to fore/aft and lateral forces (side loads) during operation of the vehicle. This is accomplished by utilizing the relatively high dynamic rate of the elastomeric system 10 in the horizontal direction, that is fore/aft and laterally. This is a distinct advantage over prior art arrangements using complicated linkages. Not only is vibration considerably reduced, but also durability is improved. The first elastomeric system 30 also provides a relatively soft vertical rate in combination with the actuator 38 so the mainly high amplitude, low frequency motion or shake of the engine is isolated. As a part of this concept is also the factor that the vibration cancelling forces of the actuator 38 may be efficiently and effectively applied. To best achieve this end, each elastomeric pad 34 may comprise a 40 DURO 50×50 mm rubber material, 21 mm thick with two equally spaced 1 mm thick metal rate plates. This provides a fore/aft ($K_y$) and lateral ($K_x$) stiffness of greater than 3000 N/mm and a vertical ($K_z$) stiffness of approximately 240 N/mm with a $T_{MAX}=42$ PSI (assuming 0.8" deflection in the Z direction).

The intermediate insert 14 is connected to the second mounting member 16 by means of a second elastomeric system 46, which includes similar elastomeric pad 48 with integral rate plates 50. This elastomeric system 46 is mounted in series with the first rubber system and is designed to compliment its load support/vibration control. Thus, the second system 46 is particularly adapted to provide a relatively high vertical rate, and a relatively soft fore/aft and lateral rate. For example, the second elastomeric system 46 may include 50 DURO 75×60 mm elastomeric pad 48, 27 mm thick with two equally spaced 1 mm thick metal rate plates. Such a elastomeric system 46 provides a fore/aft ($K_y$) and lateral ($K_x$) stiffness of approximately 115 N/mm and a vertical ($K_z$) stiffness of approximately 2700 N/mm with a $T_{MAX}=80$ PSI (again, assuming 0.8" deflection in the Z direction).

Accordingly, the second elastomeric system 46 provides sufficient hardness and stiffness for firm vertical engine support, as well as some relatively low horizontal stiffness to provide additional isolation under extreme conditions, such as the engine shake caused during rapid acceleration or hard cornering, or to a degree under severe rough road surface conditions. That is to say, a relatively soft fore/aft and lateral rate allows deflection of the mount assembly 10 in response to engine or component movement in these horizontal directions. Advantageously, the series interconnection of the two elastomeric systems 30, 46 thus provides an effective relatively soft rate in both the vertical and fore/aft and lateral directions for excellent vibration control, but at the same time without significant sacrifice of the desired firm load support. In essence and in terms of vibration control, it is identified that the unique interaction between the systems 30, 46 gives optimum performance in the low amplitude/high frequency range of motion for suppression and isolation of vibration, and at the same time highly effective damping of the larger engine displacements or shake in the high amplitude/low frequency range.

Figure 3:
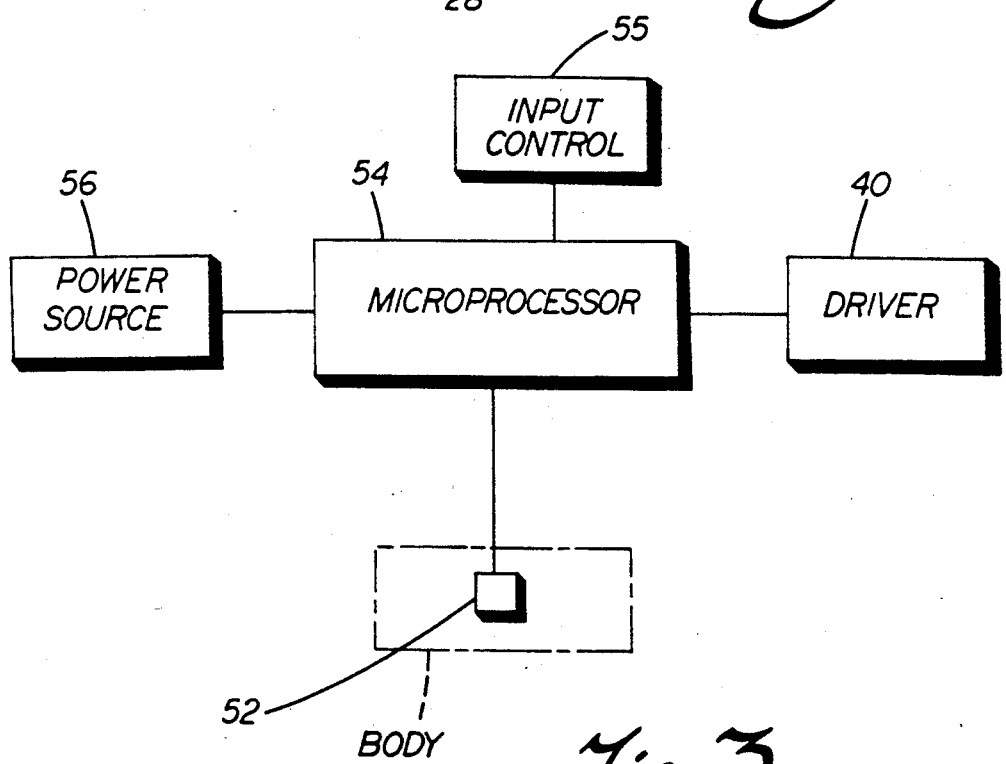
FIG. 3 is a schematical representation of the control circuit of the mount assembly of the present invention.

In order to control the actuator 38 of the mount assembly 10 to accomplish these favorable results, one or a series of accelerometers 52 or other suitable transducers are mounted to the body to measure actual vibrations and/or the vehicle residual vibrations, as schematically shown in FIG. 3. Data from the accelerometer 52 (one being shown) is sent to a microprocessor controller 54, such as an NCT-2010 manufactured by Noise Cancellation Technologies, Inc., Linthicum, Md., powered from a suitable source 56. The data relating to the vibrations is analyzed by the controller 54 to determine the harmonic components of the vibrations. Next, the controller 54 constructs the appropriate output waveform. All this is done in accordance with the broad teachings set forth in U.S. Pat. Nos. 4,153,815 and 4,417,098 to Chaplin et al., 4,480,373 to Ross and 4,878,188 to Ziegler, Jr., the disclosures of which are incorporated herein by reference. The appropriate harmonic forces are then fed back to the linear driver 40 of the actuator 38 to avoid transmission of the vibration to the body.

In operational testing of a prototype mount assembly 10, and with proper tuning through input control 55, component isolation and noise suppression is proven to be capable of significant enhancement at various selected frequencies and moderate amplitudes when utilizing the mount assembly 10 of the present invention. For example, with the controller 54 thus programmed to provide an in-phase harmonic force to the linear driver 40, approximately 35dB and 30dB reduction in noise is achieved at 23 and 66.5 Hz, respectively. Similar results targeted to troublesome resonant frequencies are achievable over substantially the full applicable frequency range.

In summary, numerous benefits have been described which result from employing the concepts of the present invention. Advantageously, the mount assembly 10 of the present invention addresses, and largely solves the need to provide noise suppression and engine damping or isolation with elastomeric working parts, while also maintaining the necessary firm engine support. Accordingly, the transmission of noise to the vehicle passenger compartment is substantially eliminated, and objectionable high amplitude vibrations are suppressed. Advantageously, these highly desirous performance features are provided in a mount assembly 10 of relatively simple construction requiring only a pair of elastomeric systems 30, 46 in series, and no hydraulic components. Through operation of the sensor 52, controller 54, input control 55 and actuator 38, the performance of the mount assembly 10 may even be tuned to the specific operating parameters and conditions of the vehicle so as to provide optimum performance at all times.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the mount assembly 10 of present invention may be used in combination with hydraulic mount technology to provide a hybrid mount having unique characteristics required for certain applications. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

We claim:

1. A mount assembly for mounting a component to a vehicle providing active control of vehicle vibration, comprising:
   a first mounting member;
   a second mounting member;
   first and second dynamic means connected in series between said members for vertical isolation and motion control and fore/aft and lateral isolation and motion control respectively;
   means for sensing component vibration;
   actuator means in parallel with said first dynamic means for providing a substantially vertical force to said first dynamic means; and
   control means for operating said actuator means in response to said sensing means so that said vertical force tends to cancel said sensed vibration;
   whereby a relatively soft vertical rate is effected by said first dynamic means and said actuator means for noise suppression, as well as effective component motion control.

2. A mount assembly for mounting a component to a vehicle providing active control of vehicle vibration, comprising:
   a first mounting member;
   a second mounting member;
   an intermediate insert between said first and second mounting members;
   first dynamic means connected between said first mounting member and said intermediate insert for vertical isolation and motion control;
   second dynamic means connected between said second mounting member and said intermediate insert in series with said first dynamic means for fore/aft and lateral isolation and motion control;
   means for sensing component vibration;
   actuator means in parallel with said first dynamic means and interconnecting said first mounting member and said intermediate insert for providing a substantially vertical force to said first dynamic means; and
   control means for operating said actuator means in response to said sensing means so that said vertical force tends to cancel said sensed vibrations;
   whereby a relatively soft vertical rate is effected by said first dynamic means and said actuator means for noise suppression, as well as effective component motion control.

3. The vehicle mount assembly set forth in claim 2, wherein said intermediate insert includes upwardly projecting legs and a base plate.

4. The vehicle mount assembly set forth in claim 3, wherein said first mounting member includes a box beam projecting inside said legs of said intermediate insert; said first dynamic means including an elastomeric means extending between said box beam and said legs.

5. The vehicle mount assembly set forth in claim 4 wherein said second dynamic means includes elastomeric means extending between said intermediate insert and said second mounting means.

6. A mount assembly for mounting a component to a vehicle providing active control of vehicle vibration, comprising:
   a first mounting member;
   a second mounting member;
   first and second dynamic means connected in series between said members for vertical isolation and motion control and fore/aft and lateral isolation and motion control, respectively; said first and second dynamic means including elastomeric pad means; said first dynamic means having a relatively soft vertical rate and a relatively high fore/aft and lateral rate; said second dynamic means having a relatively soft fore/aft and lateral rate and a relatively high vertical rate;
   means for sensing component vibration;
   actuator means in parallel with said first dynamic means for providing a substantially vertical force to said first dynamic means; and
   control means for operating said actuator means in response to said sensing means in phase so that said vertical force tends to cancel said sensed vibration;
   whereby a relatively soft vertical rate is effected by said first dynamic means and said actuator means for noise suppression, as well as effective component damping.

7. The vehicle mount assembly of claim 6 wherein said actuator means includes a linear driver and a connecting rod, and a swivel joint to connect said rod to said second dynamic means.

* * * * *